United States Patent
Zutz

[11] Patent Number: 5,560,621
[45] Date of Patent: Oct. 1, 1996

[54] ASYMMETRICAL SLIDE RING SEAL ASSEMBLY

[75] Inventor: Hans-Henning Zutz, Wermelskirchen, Germany

[73] Assignee: AE Goetze GmbH, Burscheid, Germany

[21] Appl. No.: 565,957

[22] Filed: Dec. 4, 1995

[30] Foreign Application Priority Data

Dec. 7, 1994 [DE] Germany ............ 44 43 448.0

[51] Int. Cl.⁶ ................................................ F61J 15/32
[52] U.S. Cl. ....................................... 277/84; 277/92
[58] Field of Search ......................... 277/63, 84, 85, 277/92, 96.1

[56] References Cited

U.S. PATENT DOCUMENTS

| | | | |
|---|---|---|---|
| 2,590,759 | 3/1952 | Dale et al. | 277/92 |
| 4,176,848 | 12/1979 | Lafuze | 277/92 |
| 4,327,921 | 5/1982 | Reinsma et al. | 277/85 |
| 4,421,327 | 12/1983 | Morley et al. | |
| 4,516,641 | 5/1985 | Burr | 277/92 |

FOREIGN PATENT DOCUMENTS

| | | |
|---|---|---|
| 2260732 | 9/1975 | France. |
| 2322318 | 3/1977 | France. |
| 1930730 | 12/1970 | Germany ............ 277/92 |
| 8915632 | 1/1991 | Germany. |

*Primary Examiner*—Scott Cummings
*Attorney, Agent, or Firm*—Spencer & Frank

[57] ABSTRACT

A slide ring seal assembly includes first and second machine components each having an annular clamping face coaxial with the rotary axis of the assembly; and first and second slide rings including respective inner and outer peripheral clamping faces each surrounding the assembly axis. The slide rings together define an annular sliding surface surrounding the assembly axis. First and second elastic sealing rings are compressed between the respective clamping faces of the machine components and the slide rings. The first sealing ring and the clamping face of the first machine component together define a first sealing area and the second sealing ring and the clamping face of the second slide ring together define a second sealing area. Each sealing area is bordered by a boundary line distal from the annular sliding surface and by a boundary line proximal to the annular sliding surface. An imaginary line lying in a plane containing the assembly axis and connecting the distal boundary line of the first sealing area with the proximal boundary line of the second sealing area intersects the annular sliding surface approximately at a midpoint of its radially measured width.

3 Claims, 1 Drawing Sheet

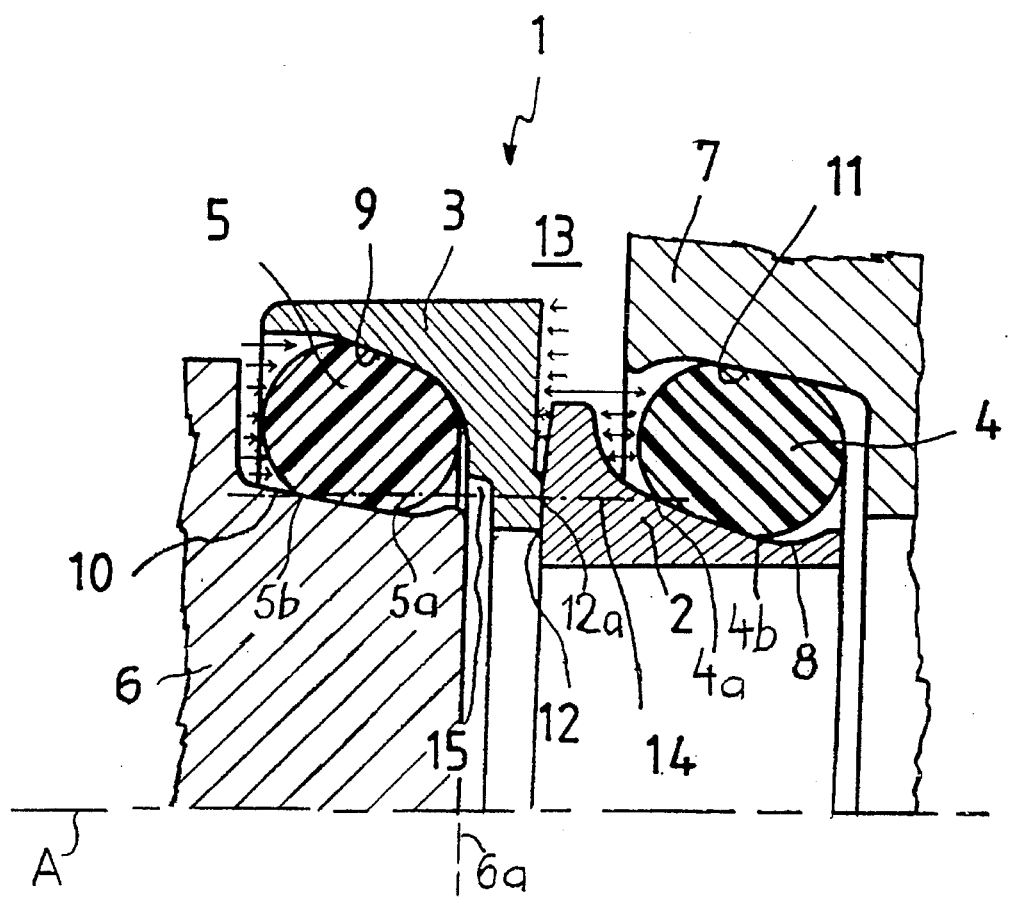

1

ASYMMETRICAL SLIDE RING SEAL ASSEMBLY

CROSS REFERENCE TO RELATED APPLICATION

This application claims the priority of German Application No. P 44 43 448.0 filed Dec. 7, 1994, which is incorporated herein by reference.

BACKGROUND OF THE INVENTION

This invention relates to a slide ring seal assembly formed of two coaxially arranged, relatively rotatable slide rings each having an annular clamping face for receiving an elastic sealing ring which, in the installed state, is situated between the clamping face of the respective slide ring and a corresponding counterface of a machine component to ensure a friction-based torque transmission between the machine component and the respective slide ring. The respective annular clamping face is arranged along an inner circumferential periphery of one slide ring and along an outer circumferential periphery of the other slide ring.

Slide ring seal assemblies of the above-outlined type are used particularly in an environment where the operating conditions expose the components to a high degree of wear. Thus, for example, the running gears of track laying vehicles and construction machines are, during operation, exposed to a high degree of wear by dust, sand, sludge, stones and the like. For such applications, steel slide ring seal assemblies have been developed as disclosed, for example, in U.S. Pat. No. 4,421,327.

The conventional slide ring seal assembly essentially includes two slide rings of unlike geometrical configuration. A sealing ring is received on the annular clamping face of each slide ring. The sealing rings are axially spaced and are diagonally disposed relative to one another. Such sealing systems are generally referred to as asymmetrical slide ring seal assemblies.

Currently designed drive axles of construction machines equipped with wet laminar brakes are, as a rule, sealed by means of asymmetrical slide ring seal assemblies. Heavy-duty requirements of the drive axles, however, often call for more powerful braking systems. For the cooling of such systems, large quantities of coolant oil should be available under elevated pressures. Accordingly, a continuous pressure of 2.5 bar which, dependent upon requirements, may be increased up to 25 bar is utilized in such structures.

Conventional asymmetrical sealing systems cannot be used in such a high-pressure environment, because structurally they are configured such that the hydrostatic pressure unilaterally stresses the slide ring seal assembly. As a result, the assembly is axially displaced in one direction, thus causing leaks in the system.

SUMMARY OF THE INVENTION

It is an object of the invention to provide an improved slide ring seal assembly of the above-outlined type for utilization in spaces to be sealed at higher than atmospheric pressures.

This object and others to become apparent as the specification progresses, are accomplished by the invention, according to which, briefly stated, the slide ring seal assembly includes first and second machine components each having an annular clamping face coaxial with the rotary axis of the assembly, and first and second slide rings including respective inner and outer peripheral clamping faces each surrounding the assembly axis. The slide rings together define an annular sliding surface surrounding the assembly axis. First and second elastic sealing rings are compressed between the respective clamping faces of the machine components and the slide rings. The first sealing ring and the clamping face of the first machine component together define a first sealing area and the second sealing ring and the clamping face of the second slide ring together define a second sealing area. Each sealing area is bordered by a boundary line distal from the annular sliding surface and by a boundary line proximal to the annular sliding surface. An imaginary line lying in a plane containing the assembly axis and connecting the distal boundary line of the first sealing area with the proximal boundary line of the second sealing area intersects the annular sliding surface approximately at a midpoint of its radially measured width.

The invention provides that the internal hydrostatic pressure exerted on the slide ring seal assembly is neutralized. In the closing direction, that is, in the direction of the contacting sliding (sealing) surfaces of the sliding rings, only the resultant force derived from the sealing rings is active and thus, the slide ring seal assembly is hydrostatically depressurized. Consequently, the hydrostatic pressure acting on the slide rings cannot cause a specific overload (excessive stress) of the sealing surfaces of the slide rings.

BRIEF DESCRIPTION OF THE DRAWING

The sole FIGURE illustrates an axial sectional view of a preferred embodiment of the invention in the installed state.

DESCRIPTION OF THE PREFERRED EMBODIMENT

Turning to the FIGURE, the slide ring seal assembly generally designated at 1 has an axis of rotation A and includes a stationary slide ring 2 and a rotary slide ring 3 which functions as a counterring. Both slide rings 2 and 3 are made of wear-resistant cast iron and form, together with two elastic sealing rings 4 and 5 such as O-rings, a slide ring seal assembly for use in an apparatus such as a construction machine. The elastic sealing rings 4 and 5 are axially spaced and are positioned at substantially identical distances from the rotary axis A. The slide rings 2 and 3 are in a sliding contact with one another along an annular sealing face 12.

The slide ring seal assembly 1 is an asymmetrical slide ring seal assembly since the slide rings 2 and 3 have unlike geometrical configurations. The slide ring 2 has a frustoconical clamping face 8 along its outer periphery, while the slide ring 3 has a frustoconical clamping face 9 along its inner periphery. The machine components 6 and 7 have corresponding counterfaces (clamping faces) 10 and 11 which are oriented towards the clamping faces 9 and 8 of the respective slide rings 3 and 2. The sealing ring 4 is compressed between the clamping face 8 of the slide ring 2 and the clamping face 11 of the machine component 7, whereas the sealing ring 5 is compressed between the clamping face 9 of the slide ring 3 and the clamping face 10 of the machine component 6. The sealing ring 4 and the clamping face 8 of the slide ring 2 together define an annular sealing area which is situated between axially spaced circumferential boundary lines 4a and 4b of the sealing ring 4. The boundary line 4a is proximal to and the boundary line 4b is distal from the sealing face 12. The sealing ring 5 and the clamping face 10 of the machine component 6 together define an annular sealing area which is situated between axially spaced circumferential boundary lines 5a and 5b of the sealing ring 5. The boundary line 5a is proximal to and the boundary line 5b is distal from the sealing face 12.

In the space 13 to be sealed, the slide ring seal assembly is at a high hydrostatic pressure. The space 13 is situated between the two slide rings 2 and 3, radially outwardly of the sealing face 12. The hydrostatic pressure is symbolically indicated by arrows.

The slide ring seal assembly 1 is configured such that in the zone of the sealing ring 5 the hydrostatic pressure extends to the boundary line 5b distal from the sealing surface 12 and in the zone of the sealing ring 4 the hydrostatic pressure extends to the boundary line 4a proximal to the sealing surface 12. A line which lies in an axial plane (that is, in a plane which contains the assembly axis A) and which connects the boundary lines 4a and 5b constitutes a pressure boundary line 14. The sealing surface 12 has a radial width, and the pressure boundary line 14 intersects the sealing surface 12 at least approximately at the midpoint 12a of the radial width. By virtue of such a geometrical relationship according to the invention, during operation of the sealing ring assembly 1, the hydrostatic pressures on the front and rear sides of the slide rings 2 and 3 cancel out so that the slide ring seal assembly is relieved of hydrostatic pressures.

The clamping face 10 of the machine component 6 and the clamping face 9 of the slide ring 3 converge and terminate in a common radial plane 6a. In such terminal zone the slide ring 3 has an annular undercut 15.

It will be understood that the above description of the present invention is susceptible to various modifications, changes and adaptations, and the same are intended to be comprehended within the meaning and range of equivalents of the appended claims.

What is claimed is:

1. A slide ring seal assembly comprising
   (a) an axis of rotation;
   (b) a first machine component including a first annular clamping face surrounding said axis;
   (c) a second machine component including a second annular clamping face surrounding said axis;
   (d) a first slide ring including an inner peripheral clamping face surrounding said axis and being oriented toward said first annular clamping face;
   (e) a second slide ring including an outer peripheral clamping face surrounding said axis and being oriented toward said second annular clamping face; said first and second slide rings being in contact with one another to define an annular sliding surface surrounding said axis and having a radially measured width;
   (f) a first elastic sealing ring compressed between said inner peripheral clamping face of said first slide ring and said first clamping face of said first machine component; said first elastic sealing ring and said first clamping face of said first machine component together defining a first annular sealing area surrounding said axis; said first sealing area being bordered by a boundary line distal from said annular sliding surface and by a boundary line proximal to said annular sliding surface; and
   (g) a second elastic sealing ring compressed between said outer peripheral clamping face of said second slide ring and said second clamping face of said second machine component; said second elastic sealing ring and said second clamping face of said second machine component together defining a second annular sealing area surrounding said axis; said second sealing area being bordered by a boundary line distal from said annular sliding surface and by a boundary line proximal too said annular sliding surface; said first and second sealing areas and said annular sliding surface being positioned relative to one another such that an imaginary line lying in a plane containing said axis and connecting the distal boundary line of said first sealing area with the proximal boundary line of said second sealing area intersects said annular sliding surface approximately at a midpoint of said radially measured width of said annular sliding surface.

2. The slide ring seal assembly as defined in claim 1, wherein said first and second elastic sealing rings are axially spaced and are positioned at substantially identical distances from said rotary axis.

3. The slide ring seal assembly as defined in claim 1, wherein said first clamping face of said first machine component and said inner peripheral clamping face of said first slide ring converge and terminate in a common plane perpendicular to said axis; further comprising an undercut portion provided in said first slide ring in a zone of said common plane.

* * * * *